(12) United States Patent
Bennetto et al.

(10) Patent No.: US 7,457,809 B2
(45) Date of Patent: Nov. 25, 2008

(54) SYSTEM AND METHOD FOR RETRIEVING AND ANALYZING DATA FROM A VARIETY OF DIFFERENT SOURCES

(75) Inventors: John Bennetto, Seattle, WA (US); Jon B. Avner, Redmond, WA (US); Kevin C. Chase, Redmond, WA (US); Paul J. Bowden, Swindon (GB)

(73) Assignee: Microsoft Corporation, Redmond, WA (US)

( * ) Notice: Subject to any disclaimer, the term of this patent is extended or adjusted under 35 U.S.C. 154(b) by 379 days.

(21) Appl. No.: 11/064,687

(22) Filed: Feb. 24, 2005

(65) Prior Publication Data

US 2006/0212879 A1 Sep. 21, 2006

(51) Int. Cl.
*G06F 17/30* (2006.01)
*G06F 15/16* (2006.01)

(52) U.S. Cl. .................. 707/100; 707/101; 707/102

(58) Field of Classification Search .............. 707/3, 707/101, 103 Y
See application file for complete search history.

(56) References Cited

U.S. PATENT DOCUMENTS

2002/0169738 A1* 11/2002 Giel et al. .................. 706/60
2005/0021713 A1* 1/2005 Dugan et al. ............... 709/223

OTHER PUBLICATIONS

W3C Working Draft, "XML Path Language (XPath) 2.0", http://www.w3.org/TR/2003/WD-xpath20-20030502/, May 2003, pp. 1-10.*

* cited by examiner

*Primary Examiner*—Tony Mahmoudi
(74) *Attorney, Agent, or Firm*—Woodcock Washburn LLP (57) ABSTRACT

A flexible, extensible, uniform, and efficient framework for retrieving and analyzing data from a number of different data sources is disclosed. Instructions for retrieving and analyzing data are provided in a configuration file that is defined in a common format irrespective of the different data sources. The configuration file is submitted to a dispatcher, which uses the information therein to dispatch a number of data source collectors. Each such data source collector is unique to a corresponding data source and is able to formulate an efficient method for retrieving the necessary data from its corresponding data source. An analyzer then analyzes the retrieved data according to the instructions in the configuration file.

18 Claims, 4 Drawing Sheets

SYSTEM AND METHOD FOR RETRIEVING AND ANALYZING DATA FROM A VARIETY OF DIFFERENT SOURCES

FIELD OF THE INVENTION

The present invention relates to the field of data retrieval and analysis, and, more specifically, to retrieving and analyzing data from a variety of different data sources with potentially different addressing and access protocols.

BACKGROUND OF THE INVENTION

Complex distributed applications typically store configuration information in a variety of different data sources. For example, Microsoft® Exchange Server from MICROSOFT Corp. of Redmond, Wash. is a messaging platform that accesses configuration data from a number of external sources. A common external source is the Active Directory® also from the above mentioned MICROSOFT Corp. The Active Directory stores Exchange Server configuration information such as definitions of administrative groups, routing groups, configuration settings for protocol virtual servers, and the like. Another common external source is Internet Information Services (IIS), a web server also from the above mentioned MICROSOFT Corp. IIS stores configuration data in its IIS metabase store. Yet another common external source is Windows® Management Instrumentation (WMI), a web based enterprise management (WBEM) application also from the above mentioned MICROSOFT Corp. WMI provides information about the configuration and state of Exchange Servers. In addition to these and other external sources, configuration information for Exchange Server may be stored in the Windows® Registry also from the above mentioned MICROSOFT Corp.

The configuration data within each of these different external sources is typically addressed and accessed in a variety of different ways. For example, the Active Directory is structured as a hierarchy of objects. Such objects may be, for example, mailboxes, distribution lists, servers, configuration objects, and the like. Each object contains attributes in which information about that object is stored. Objects may be container objects, meaning that they contain other objects, or they may be leaf objects, in which case they do not contain other objects. Data for Active Directory objects may be accessed using, for example, Lightweight Directory Access Protocol (LDAP), which is a directory service protocol that runs directly over the TCP/IP stack. WMI objects, on the other hand, may be represented as hierarchical lists of objects that have properties and methods and may also be selected using the WMI query language, which is similar in structure to the SQL query language. Still other various addressing schemes and access protocols may be employed for the IIS metabase and the Registry.

Applications such as Exchange Server may often pull configuration data from these different sources and execute a rule set on the data to determine its validity. A drawback of this process is that, because the data within each of the sources is potentially addressed and accessed differently, a number of different methods may be required to retrieve the data. The formulation and execution of these methods may be a time consuming and tedious process that delays the configuration and/or setup of the application and diverts valuable development time human resources. For example, to pull configuration information from both the Active Directory and the WMI source, it may be necessary to generate both a separate set of LDAP queries and a separate set of WMI queries in accordance with the addressing schemes and access protocols of each of the data sources. Additionally, a number of different rules may need to be employed to analyze each of the retrieved data sets. Accordingly, there is a need in the art for systems and methods for retrieving and analyzing data from a number of different sources.

SUMMARY OF THE INVENTION

The present invention provides a flexible, extensible, uniform, and efficient framework for retrieving and analyzing data from a number of different data sources. Instructions for retrieving and analyzing data are provided in a configuration file, which is defined in a common format irrespective of the different address schemes and access protocols of the different data sources. The configuration file is submitted to a dispatcher, which uses the information therein to dispatch a number of data source collectors. Each such data source collector is unique to a corresponding data source and is able to formulate an efficient method for retrieving the necessary data from its corresponding data source. The retrieved data from the different sources and corresponding rules for analyzing the data are then compiled in a data file that is passed to an analyzer. The analyzer evaluates each of the rules based on the retrieved data and may output the results to a portable analysis file.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different acts or elements similar to the ones described in this document, in conjunction with other present or future technologies.

Figure 1:
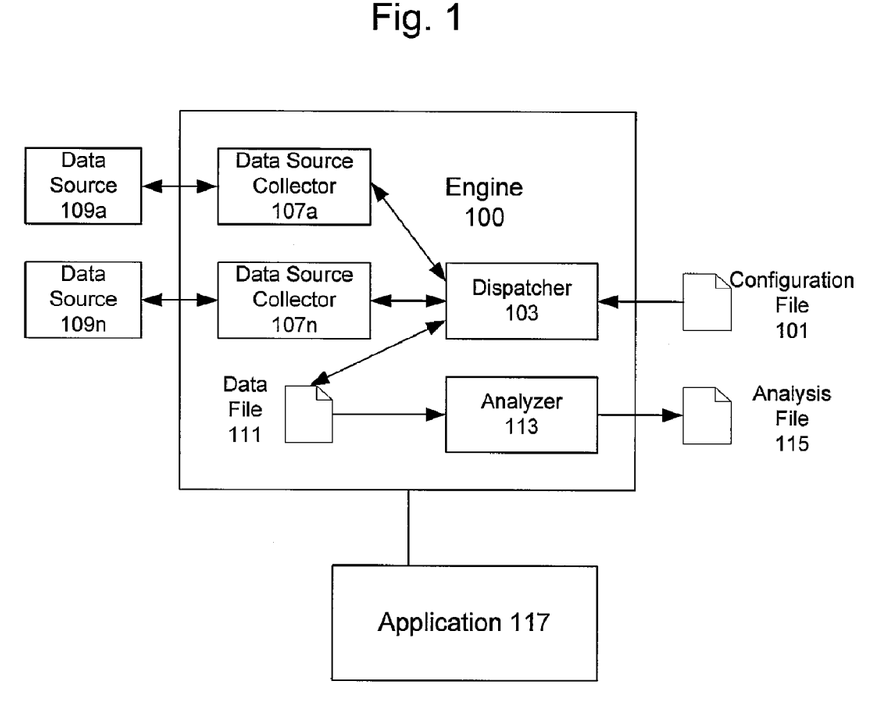
FIG. 1 is a block diagram of an exemplary system for retrieving and analyzing data in accordance with the present invention.

A block diagram of an exemplary system for retrieving and analyzing data in accordance with the present invention is shown in FIG. 1. Generally, engine 100 enables the retrieval and analysis of data from one or more data sources 109*a-n*. Engine 100 may be used in connection with application 117, which may be, for example, Exchange Server. Engine 100 may, for example, be used to retrieve and analyze configuration data associated with application 117. Engine 100, however, is not limited to use with configuration data and the retrieval and analysis of any type of data irrespective of its content is contemplated in accordance with the present invention.

Instructions for retrieving and analyzing data from data sources 109a-n are provided in a configuration file 101. Configuration file 101 may be defined in a programming language such as extensible markup language (XML). Configuration file 101 is defined in a common format irrespective of the potentially different address schemes and accessing protocols of data sources 109a-n. Generally, configuration file 101 defines four sets of primary elements: a set of one or more objects, a set of one or more object processors, a set of one or more settings within each object, and a set of one or more rules. Configuration file 101 may also define other elements if necessary.

Each object element identifies a collection of data to be retrieved from a data source 109. Each object element may represent a particular container within a data source 109 or any generic collection of data. Each object element may have a set of corresponding object attributes that define the object. One such object attribute may be an object type attribute that identifies a type of data source in which the object is stored. For example, for data that is stored in an LDAP server, the object may be an LDAP type. Other object attributes may, for example, identify a start node from which to begin a search. The object attributes may also define a "scope" of a search, which may be a quantity of levels, nodes, or sub-trees in which to execute a search. The object attributes may also define a "filter", which identifies a particular search criteria. For example, a filter may be used to limit a search to a class of objects associated with application 117.

In addition to a set of object elements, configuration file 101 includes a set of one or more object processor elements. Each such object processor element corresponds to a particular object type of one or more of the object elements in configuration file 101. For example, one or more LDAP type object elements will map to a single LDAP object processor. The object processor element maps its corresponding object type to a method that is capable of processing it. An object processor may be, for example, a string representing a C# class. For each object element, configuration file 101 also includes a set of one or more setting elements that are nested within the object. The settings represent any generic sub-set of the object and may identify specific properties of the object or specific operations to be performed. Finally, configuration file 101 includes a set of rule elements. The rule elements are nested within setting elements and identify the analysis to be performed upon the corresponding settings. The rules may, for example, use XPath statements to reference the data retrieved for the corresponding settings.

Configuration file 101 is submitted to dispatcher 103, which reads the configuration file 101 and performs a number of operations based on the information therein. First, dispatcher 103 loads each object processor specified in configuration file 101. Dispatcher 103 then proceeds to sequentially process each object specified in configuration file 101. To process an object, dispatcher 103 dispatches one of the data source collectors (DSC's) 107a-n that corresponds to the object's type. For example, for an LDAP object, dispatcher 103 will dispatch an LDAP DSC. Upon dispatching the DSC 107, dispatcher 103 will forward the object element and its included set of one or more settings and rules to the DSC 107.

Each DSC 107 is unique to a particular data source 109 and is capable of formulating a method for retrieving data for the object from its corresponding data source 109. Such a method will typically involve generating a query that is formatted for the particular corresponding data source 109. For example, an LDAP DSC is capable of generating LDAP queries, while a WMI DSC is capable of generating WMI queries. Upon retrieving the data for the object, DSC 107 may create a set of zero or more instances that match the data. For each instance, DSC 107 may copy over the settings elements for the original object and retrieve the data for the specified settings. The rule elements are also be copied over and put into each instance but they are not evaluated by DSC 107. The DSC 107 will then pass the retrieved data back to the dispatcher 103. The retrieved data may be passed back as an XML fragment.

Upon receiving the retrieved data and the corresponding rules from the DSC 107, dispatcher 103 writes the retrieved data and the corresponding rules to data file 111, which may also be an XML file. Dispatcher 103 then proceeds to recursively process the remaining objects within configuration file 101. Once all the objects have been processed, dispatcher 103 submits the completed data file 111 to analyzer 113. Analyzer 113 reads data file 111 and evaluates each rule element based on the retrieved data. Analyzer 113 may then generate an analysis file 115, which includes the retrieved data as well as any issues found based on the rules that were fired. The resulting analysis file 115 may be also an XML file and may be completely portable.

According to an embodiment of the invention, any of the settings within configuration file 101 may have an associated substitution attribute. The substitution attribute is a variable that is set to the value of the data retrieved for the corresponding setting. An advantageous feature of the substitution attribute is that any of the other settings or objects within configuration file 101 may reference the substitution attribute. A substitution is then performed for each other referencing setting or object, meaning that the value of the data retrieved for that referencing setting or object is replaced with the value of the substitution attribute. These substitutions may be performed by dispatcher 103 just prior to writing the data for the referencing settings or objects to the data file 111. Thus, the data within data file 111 will include the substituted data values rather than the original data values. The substituted value may and typically will be different for each instance of the object.

Figure 2:
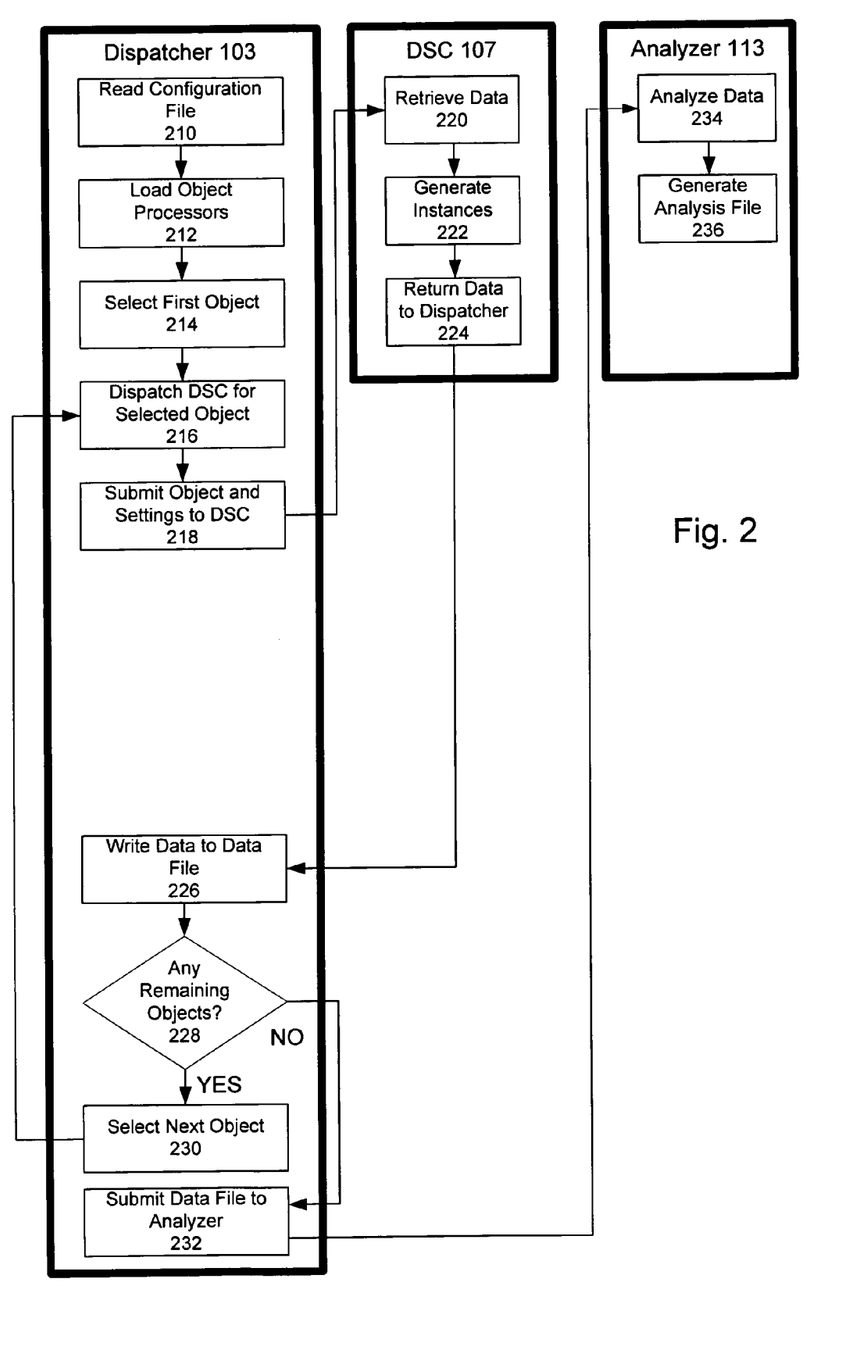
FIG. 2 is a flowchart of an exemplary method for retrieving and analyzing data in accordance with the present invention.

A flowchart of an exemplary method for retrieving and analyzing data in accordance with the present invention is shown in FIG. 2. At act 210, dispatcher 103 reads configuration file 101. As set forth above, configuration file 101 may be an XML file and may define a set of four primary sets of elements including set a of one or more objects, a set of one or more object processors, a set of one or more settings within each object, and a set of one or more rules for analyzing the data to be retrieved.

At act 212, dispatcher 103 loads the object processors identified in configuration file 101. Each object processor corresponds to a particular object type. If multiple object types are included in configuration file 101, then multiple object processors may be loaded at act 210. If multiple objects of the same object type are included in configuration file 101, then only a single object processor may be loaded for those objects.

After loading the object processors, each object in configuration file 101 is sequentially processed. At act 214, dispatcher 103 selects a first object for processing. At act 216, dispatcher 103 locates and dispatches one of DSC's 107a-n that corresponds to the selected object's type, which may be specified in configuration file 101 using an object type attribute associated with the corresponding object element. At act 218, dispatcher 103 submits the object element and its included set of one or more settings and rules to the dispatched DSC 107.

At act 218, the DSC 107 retrieves the data corresponding to the object from its corresponding data source 109. To retrieve the data, DSC 107 must formulate a retrieval method that is formatted to the particular addressing schemes and access protocols of the data source 109. As set forth above, such a method will typically involve generating a query that is formatted for the particular data source 109. Upon retrieving the data for the object, at act 222, DSC 107 generates a set of zero or more instances that match the data. At act 224, The DSC 107 will then pass the retrieved data and the corresponding rules back to the dispatcher 103. The retrieved data may be passed back as an XML fragment.

Upon receiving the retrieved data and the corresponding rules from the DSC 107, at act 226, dispatcher 103 writes the retrieved data and the corresponding rules to data file 111, which may also be an XML file. For any settings retrieved that have substitutions specified, dispatcher 103 may fill in those substitutions at this time. Also, for all other objects and settings that reference the substitution, dispatcher 103 may at this time replace the attribute values of those referencing objects and settings with the actual value of the substitution.

Dispatcher 103 then proceeds to recursively process the remaining objects within configuration file 101. If, at act 228, there are still remaining unprocessed objects in the configuration 101, then, at act 230, dispatcher 103 sets one of those remaining objects to be the new selected object for processing and the method returns to act 216 for processing the new selected object. If, on the other hand, all objects in configuration file 101 have been processed, then, at act 232, the completed data file 111 is submitted to analyzer 113. At act 234, analyzer 113 reads data file 111 and evaluates each rule element based on the retrieved data, and, at act 236, analyzer 113 generates the resulting analysis file 115.

Accordingly, as set forth above with reference to the exemplary systems and methods of FIGS. 1 and 2, the present invention provides a flexible, extensible, uniform, and efficient framework for retrieving and analyzing data from a number of different data sources. As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the present invention.

Figure 3:
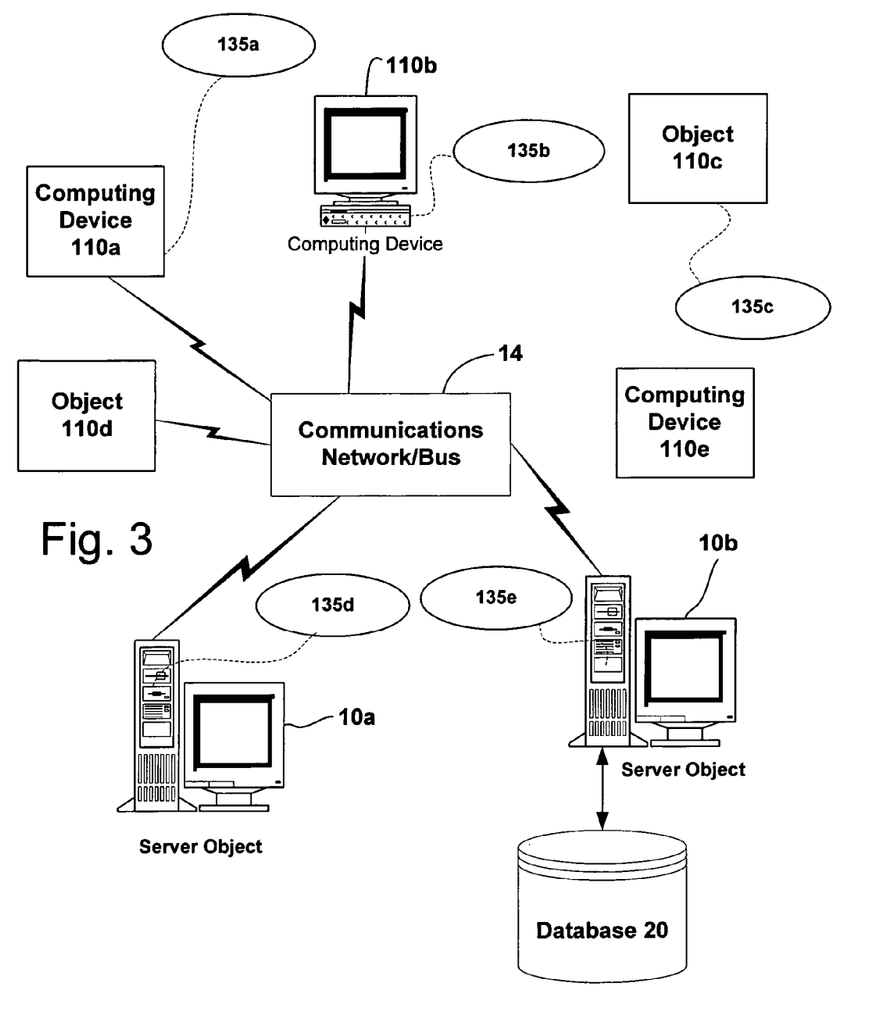
FIG. 3 is a block diagram representing an exemplary network environment having a variety of computing devices in which the present invention may be implemented.

FIG. 3 provides a schematic diagram of an exemplary networked or distributed computing environment. The distributed computing environment comprises computing objects 10*a*, 10*b*, etc. and computing objects or devices 110*a*, 110*b*, 110*c*, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices, and may itself represent multiple interconnected networks. In accordance with an aspect of the invention, each object 10*a*, 10*b*, etc. or 110*a*, 110*b*, 110*c*, etc. may contain an application that might make use of an API, or other object, software, firmware and/or hardware, to request use of the processes used to implement the present invention.

It can also be appreciated that an object, such as 110*c*, may be hosted on another computing device 10*a*, 10*b*, etc. or 110*a*, 110*b*, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 3, computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the invention may be distributed across multiple computing devices.

Client(s) and server(s) may communicate with one another utilizing the functionality provided by a protocol layer. For example, Hypertext Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 3 illustrates an exemplary networked or distributed environment, with a server in communication with client computers via a network/bus, in which the present invention may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention.

In a network environment in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database, memory, or other storage element 20 for storing data processed according to the invention. Thus, the present invention can be utilized in a computer network environment having client computers 110a, 10b, etc. that can access and interact with a computer network/bus 14 and server computers 10a, 10b, etc. that may interact with client computers 110a, 110b, etc. and other like devices, and databases 20.

Figure 4:
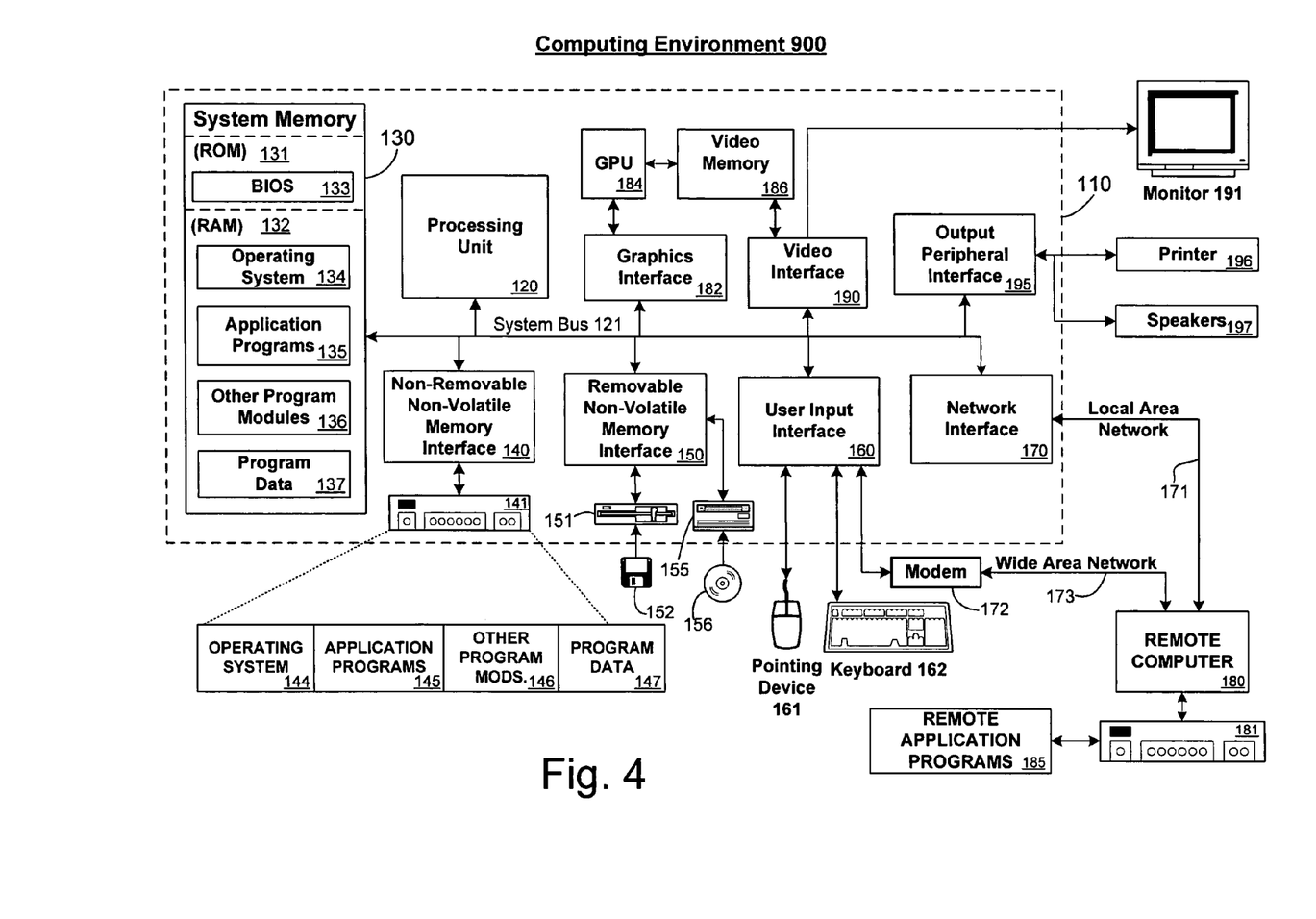
FIG. 4 is a block diagram of an exemplary representing an exemplary computing device in which the present invention may be implemented.

FIG. 4 and the following discussion are intended to provide a brief general description of a suitable computing device in connection with which the invention may be implemented. For example, any of the client and server computers or devices illustrated in FIG. 3 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 4 thus illustrates an example of a suitable computing system environment 400 in which the invention may be implemented, although as made clear above, the computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

With reference to FIG. 4, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable, volatile/nonvolatile computer storage media. By way of example only, FIG. 4 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4 provide storage of computer readable instructions, data structures, program modules and other data for the computer 110. In FIG. 4, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

CONCLUSION

Thus, systems and methods for model based generation of API test code have been disclosed. While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A system for retrieving and analyzing data associated with a plurality of objects from a plurality of data sources, the system comprising:
   a processor;
   a memory;
   a configuration file that specifies in a common format the plurality of objects and, for each object of the plurality of objects, a data source, a data source collector associated with the data source, an object processor corresponding to a type of the object and mapping the corresponding type of the object to a method capable of processing the corresponding type of the object, at least one setting nested within the object, and at least one rule nested within the at least one setting and providing instructions for analyzing the data;
   the data source collectors associated with the data sources, each data source collector configured to generate a query formatted for execution at the associated data source to retrieve the data;
   a dispatcher that reads the configuration file, loads the object processors and, for each object of the plurality of objects, dispatches the data source collector associated with the data source associated with the object and submits the object and the at least one setting to the data source collector; and
   an analyzer that analyzes the data according to the at least one rule by evaluating the at least one rule based on the data and generates an analysis file that includes the data and the analysis of the data.

2. The system of claim 1, wherein the configuration file specifies, for each object of the plurality of objects, at least one attribute associated with the object that defines the object.

3. The system of claim 1, wherein the configuration file specifies, for each object of the plurality of objects, an object type attribute that identifies the data source collector.

4. The system of claim 1, further comprising a data file generated by the dispatcher that comprises the data and the at least one rule and that is submitted to the analyzer.

5. The system of claim 1, wherein the configuration file specifies a substitution attribute associated with a corresponding setting, the substitution attribute being a variable that is set to a value of the data retrieved for the corresponding setting.

6. The system of claim 5, wherein a value of each other setting in the configuration file that references the substitution attribute is replaced with the value of the substitution attribute.

7. The system of claim 5, wherein a value of each other object in the configuration file that references the substitution attribute is replaced with the value of the substitution attribute.

8. The system of claim 1, wherein the configuration file is written in extensible markup language.

9. The system of claim 1, wherein the objects are processed sequentially.

10. The system of claim 1, wherein the rules use XPath statements to reference the data associated with each setting.

11. A method for retrieving and analyzing data associated with a plurality of objects from a plurality of data sources, the method comprising:
    accessing a configuration file that specifies in a common format the plurality of objects and, for each object of the plurality of objects, a data source associated with the object, a data source collector associated with the data source, an object processor corresponding to a type of the object and mapping the corresponding type of the object to a method capable of processing the corresponding type of the object, at least one setting nested within the object, and at least one rule nested within the at least one setting and providing instructions for analyzing the data;
    receiving in the configuration file a substitution attribute associated with a corresponding setting, the substitution attribute being a variable that is set to a value of the data retrieved for the corresponding setting;
    for each other object in the configuration file that references the substitution attribute, replacing a value of the other object with the value of the substitution attribute;
    loading the object processors;
    for each object of the plurality of objects,
        dispatching the data source collector associated with the data source associated with the object;
        submitting to the data source collector the object and the at least one setting; and
        generating at the data source collector a query formatted for execution at the data source to retrieve the data;
    analyzing the retrieved data according to the at least one rule by evaluating the at least one rule based on the data; and
    generating an analysis file that includes the data and the analysis of the data.

12. The method of claim 11, further comprising receiving in the configuration file, for each object of the plurality of objects, at least one object attribute that defines the object.

13. The method of claim 12, comprising receiving, for each object of the plurality of objects, an object type attribute that identifies the data source collector.

14. The method of claim 11, further comprising:
   writing the data and the at least one rule to a data file; and
   submitting the data file to an analyzer that analyzes the data according to the at least one rule.

15. The method of claim 11, further comprising, for each other setting in the configuration file that references the substitution attribute, replacing a value of the other setting with the value of the substitution attribute.

16. The method of claim 11, further comprising writing a portable analysis file that comprises the data and an analysis of the data.

17. The method of claim 11, further comprising receiving the configuration file written in extensible markup language.

18. A computer-readable storage medium having computer-executable instructions for performing the steps comprising:
   accessing a configuration file that specifies in a common format a plurality of objects and, for each object of the plurality of objects, a data source associated with the object, a data source collector associated with the data source, an object processor corresponding to a type of the object and mapping the corresponding type of the object to a method capable of processing the corresponding type of the object, at least one setting nested within the object, and at least one rule nested within the at least one setting and providing instructions for analyzing the data;
   receiving in the configuration file a substitution attribute associated with a corresponding setting, the substitution attribute being a variable that is set to a value of the data retrieved for the corresponding setting;
   for each other object in the configuration file that references the substitution attribute, replacing a value of the other object with the value of the substitution attribute;
   loading the object processor;
   for each object of the plurality of objects,
      dispatching the data source collector associated with the data source associated with the object;
      submitting to the data source collector the object and the at least one setting; and
      generating at the data source collector a query formatted for execution at the data source to retrieve the data;
   analyzing the retrieved data according to the at least one rule by evaluating the at least one rule based on the data; and
   generating an analysis file that includes the data and the analysis of the data.

* * * * *